United States Patent
Pritchard et al.

(10) Patent No.: US 7,395,360 B1
(45) Date of Patent: Jul. 1, 2008

(54) PROGRAMMABLE CHIP BUS ARBITRATION LOGIC

(75) Inventors: Jeffrey Orion Pritchard, Santa Cruz, CA (US); Kerry Veenstra, Santa Cruz, CA (US); Aaron Ferrucci, Santa Cruz, CA (US); Paul Metzgen, London (GB)

(73) Assignee: Altera Corporation, San Jose, CA (US)

( * ) Notice: Subject to any disclaimer, the term of this patent is extended or adjusted under 35 U.S.C. 154(b) by 161 days.

(21) Appl. No.: 11/232,491

(22) Filed: Sep. 21, 2005

(51) Int. Cl.
*G06F 13/364* (2006.01)
*G06F 13/14* (2006.01)
*G06F 13/26* (2006.01)
*G06F 13/38* (2006.01)

(52) U.S. Cl. .................. 710/113; 710/116; 710/241; 710/244; 710/265

(58) Field of Classification Search ............. 710/113
See application file for complete search history.

(56) References Cited

U.S. PATENT DOCUMENTS

| | | | |
|---|---|---|---|
| 5,870,560 A * | 2/1999 | Zulian | 709/225 |
| 6,516,369 B1 * | 2/2003 | Bredin | 710/111 |
| 6,647,449 B1 * | 11/2003 | Watts | 710/111 |
| 2004/0258086 A1 * | 12/2004 | Kurupati | 370/447 |

OTHER PUBLICATIONS

John Rynearson, "VMEbus Arbitration" VITA Journal, www.vita.com, Mar. 1997, 3 pages.
Huajin et al., "Design Fast Round Robin Scheduler in FPGA" IEEE, 2002, pp. 1257-1261.
Paul Metzgen, "A high performance 32-bit ALU for programmable logic" Proceedings of the 2004 ACM/SIGDA 12th international symposium on Field programmable gate arrays, Feb. 22-24, 2004, Monterey, California, USA.

* cited by examiner

*Primary Examiner*—Paul R. Myers
*Assistant Examiner*—Ryan M Stiglic
(74) *Attorney, Agent, or Firm*—Weaver Austin Villeneuve & Sampson LLP

(57) ABSTRACT

Methods and apparatus are provided for implementing a bus arbitration priority encoding scheme with fairness. Bus arbitration logic is connected to multiple primary components or devices. The multiple primary components send requests to bus arbitration logic. The bus arbitration logic uses a request vector and an arbitration vector to determine a grant vector. The grant vector indicates what primary component should be allowed bus access.

24 Claims, 7 Drawing Sheets

PROGRAMMABLE CHIP BUS ARBITRATION LOGIC

BACKGROUND OF THE INVENTION

1. Field of the Invention

The present invention relates to bus arbitration. In one example, the present invention relates to methods and apparatus for implementing a bus arbitration priority encoding scheme with fairness.

2. Description of Related Art

A system implemented programmable chip typically includes multiple primary components such as processors and multiple secondary components such as timers and memory interconnected using one or more buses. A system implemented on a programmable chip provides a number of benefits as well as drawbacks. One drawback is that programmable chip buses are typically slower than comparable buses on specialized devices such as Application Specific Integrated Circuits (ASICs). Buses use arbitration logic to handle requests from the primary components for bus access to communicate with secondary components. Arbitration logic selects a bus master at any given time. Bus arbitration logic efficiency can significantly impact system performance.

It is typically beneficial to implement bus arbitration schemes that provide priority and fairness considerations. For example, there may be some higher priority components that deserve at greater share or bus access time. However, no primary component should be entirely locked out of bus access. Providing both priority and fairness considerations, however, can lead to inefficient and complicated arbitration logic chains on programmable chips. Consequently, many programmable chip bus arbiters are kept relatively simple. In many instances, programmable chip bus arbiters consider priority only and do not consider fairness. Consequently, some components may be provided with an undesirably disproportionate share of total bus access.

It is therefore desirable to provide improved methods and apparatus for implementing efficient bus arbitration schemes that provide fairness and/or priority considerations when selecting primary components for access to a programmable chip bus.

SUMMARY OF THE INVENTION

Methods and apparatus are provided for implementing a bus arbitration priority encoding scheme with fairness. Bus arbitration logic is connected to multiple primary components or devices. The multiple primary components send requests to bus arbitration logic. The bus arbitration logic uses a request vector and an arbitration vector to determine a grant vector. The grant vector indicates what primary component should be allowed bus access.

In one embodiment, a technique for providing access to a bus to one of multiple primary components is provided. A request vector includes the concatenation of bus access request signals from multiple primary components. An arbitration vector (A) is rotated upon determining that a current bus master should no longer be provided with access to the bus. The request vector and the arbitration vector are combined to determine a grant vector (G). The grant vector identifies one of the multiple primary components as bus master.

In another embodiment, a programmable chip system is provided. The programmable chip system includes multiple primary components, a secondary component, a bus, and bus arbitration logic. The bus connects multiple primary components to the secondary component. The bus arbitration logic is configured to identify one of the primary components as bus master by combining a request vector (R) with an arbitration vector (A) to determine a grant vector (G). The request vector (R) corresponds to the concatenation of bus access request signals from the primary components. The arbitration vector (A) is rotated upon determining that a current bus master should no longer be provided with access to the bus;

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
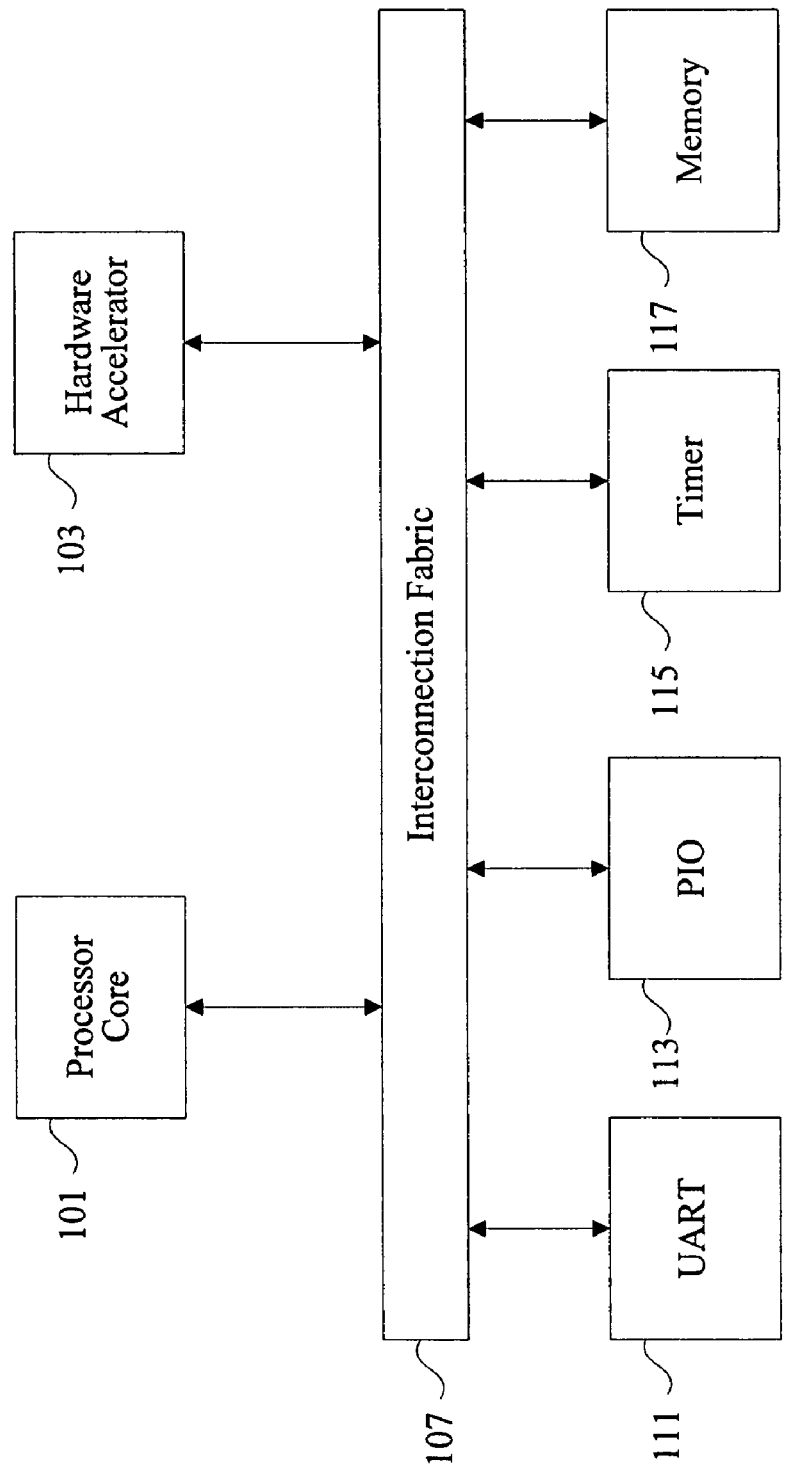
FIG. 1 is a diagrammatic representation showing a programmable device.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of programmable chips, bus access, and slave side arbitration buses. However, it should be noted that the techniques of the present invention can be applied to a variety of partially programmable devices and a variety of buses. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

A system includes a variety of components such as processors and hardware accelerators that make requests to access one or more system buses. Arbitration logic or bus arbitration logic is used to determine what component gets access to the bus at any given time. Arbitration logic may involve dedicated hardware or complicated bus protocols. In a typical arbitration scheme, a primary component makes a request to use the bus on a request line. The arbitration logic then later grants access to the primary component. The primary component may then use the bus to read data from or write data onto a secondary component such as memory or a network interface. When the bus access is complete, the primary component may also signal that use of the bus is complete. A bus release line may be used if each device does not have its own request line. The lines used for bus arbitration may be shared or physically distinct.

Typical arbitration schemes attempt to balance fairness and priority. High priority devices may require more prompt servicing of bus access requests. However, low priority devices should not be entirely locked out from bus access. Furthermore, a system designer may wish to allocate bus access on a percentage basis to various components. In order to optimize system performance, efficient buses with efficient arbitration logic is required.

Although programmable chips such as Field Programmable Gate Arrays (FPGAs) have a variety of benefits over hard coded devices such as Application Specific Integrated Circuits (ASICs), FPGAs typically have slower buses. In order to provide arbitration logic that balances both fairness and priority, more complicated arbitration logic is typically needed. Adding complicated logic to an already slower bus is extremely undesirable. Typical arbitrator logic implementations are either simple and unfair or require long chains of logic. For example, programmable chips have fast carry chain and direct interconnect logic that can be used to efficiently implement simple daisy-chain priority encoders. However, simple implementations such as daisy-chain priority encoders assign static and unequal priorities to requesters. No guarantees can be made as to fairness. Other more complicated schemes, such as round-robin scheduling, provide fairness, but require too much hardware and take too many clock cycles to be part of a high-performance bus arbitrator or arbiter.

Consequently, the techniques of the present invention provide circular carry chain logic that allows bus arbitration in an efficient and fair manner. Priority can also be added with slight modification to the circular carry chain logic. A circular carry chain can also be emulated using a double-length linear carry chain. Using a double-length linear carry chain simplifies logic synthesis while maintaining the efficiency and fairness of a bus arbiter.

FIG. 1 is a diagrammatic representation showing one example of a system on a programmable chip that can use the arbitration logic provided using the techniques and mechanisms of the present invention. The system includes a processor core, a hardware accelerator, peripheral devices, and peripheral interfaces. Peripheral devices and peripheral interfaces are herein referred to as components. The system on a programmable chip includes processor core 101 and a hardware accelerator 103 as well as peripheral components UART 111, PIO 113, timer 115, and data memory 117. In some examples, the hardware accelerator 103 is a Digital Signal Processing (DSP) core, a cryptography accelerator, or a video processor. It should be noted that the system can include both on-chip memory 117 and off-chip memory. In one example, the data memory 117 can support variable latency or fixed latency access. The components are interconnected using an interconnection fabric 107. Any mechanism or logic for connecting components in a system is referred to herein as an interconnection fabric or bus.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques and mechanisms of the present invention allow the implementation of a system on a programmable chip that includes an efficient bus arbiter that provides both fairness and priority considerations in responding to requests to access a bus or interconnection fabric.

Figure 2:
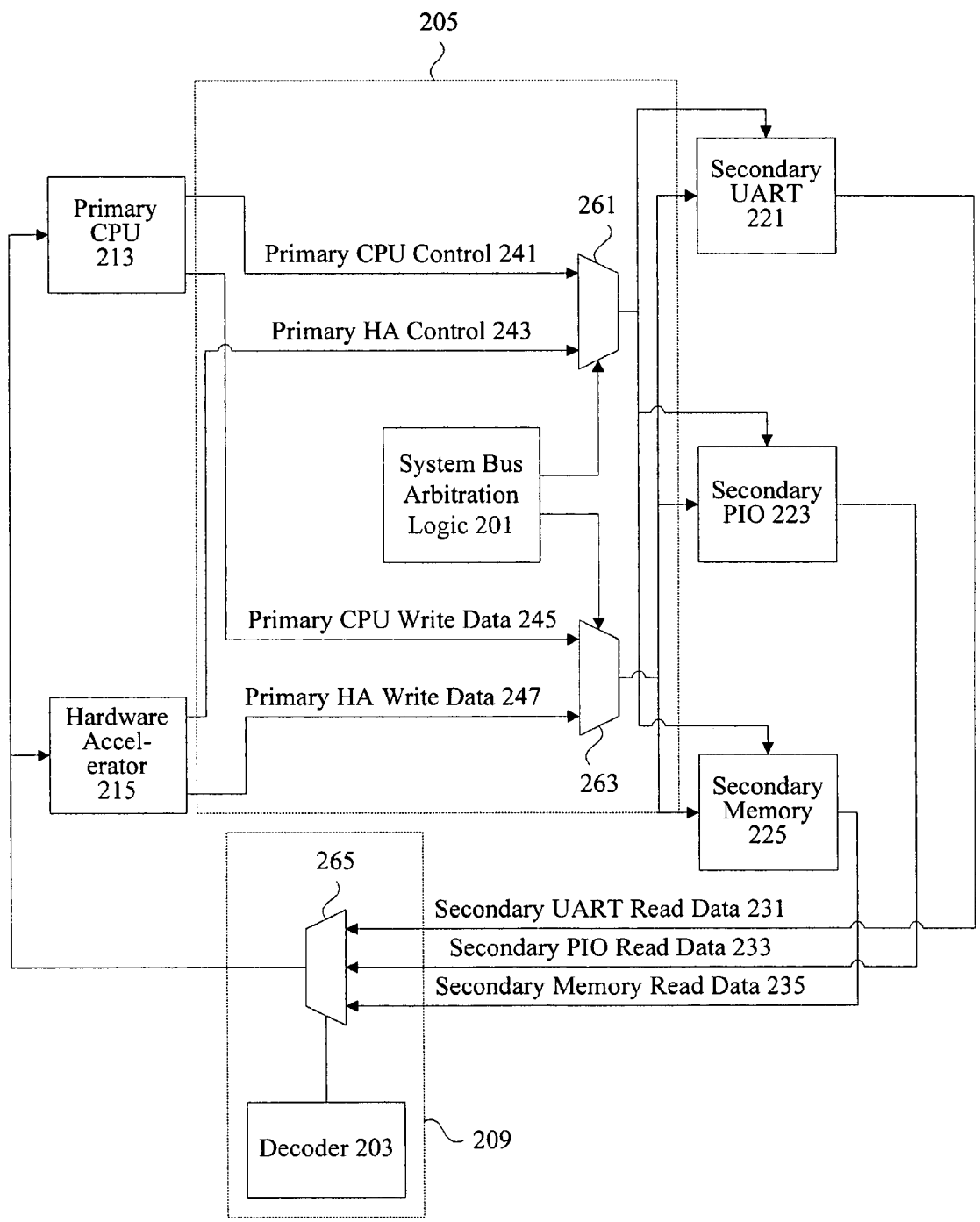
FIG. 2 is a diagrammatic representation showing a conventional bus architecture.

FIG. 2 is a diagrammatic representation depicting a hardware accelerator coupled to a microprocessor in a system using a conventional bus architecture. Although the techniques of the present invention provide significant performance benefits on a system having a secondary component side arbitration, the techniques can also be used to implement other systems such as conventional system bus implementations.

A conventional bus architecture includes a system bus arbitrator 205. A system bus arbitrator 205 includes arbitrator switching circuitry 261 and 263 as well as system bus arbitration logic 201. Logic and mechanisms for selecting an input based on a bus control signal are referred to herein as arbitration logic. It should be noted that although switching circuitry generally can be implemented using multiplexers, a variety of mechanisms including switches and transistors can be used.

Any component or device that is operable to initiate read and write operations by providing control information is referred to herein as a primary component. Primary components are sometimes referred to as master components. Control information can include a particular address associated with a secondary component. Any component or device that responds to read or write operations with information sent back to the primary component regarding the read or write operation is referred to herein as a secondary component. Secondary components are sometimes referred to as slave components. Some examples of primary components are processors, microcontrollers, and Ethernet devices. Some examples of secondary components are Universal Asynchronous Receiver Transmitters (UARTs), Parallel Input Output (PIO), program memory, and data memory. It should be noted that some components such as an Ethernet component can be both a primary component and a secondary component, as an Ethernet component has the capability of reading and writing to the secondary program memory while also responding to instructions from a primary system CPU.

Logic and mechanisms for providing the control signal based on criteria such as fairness or priority are referred to herein as arbitration logic. The inputs of the arbitrator switching circuitry 261 and 263 are connected to primary CPU 213 and hardware accelerator 215. The outputs of the arbitrator switching circuitry 261 and 263 are connected to secondary UART 221, secondary PIO 223, and secondary peripheral interface 225. The outputs of the secondary components transmit information such as read data back to the primary components through a decoder 209. Mechanisms for selecting secondary components and translating control information such as addresses is referred to herein as a decoder. In conventional computer systems, there is a single decoder for each bus. A decoder 209 includes decoder logic 203 and decoder switching circuitry 265 for selecting the particular secondary component data transfer. A decoder can also be referred to as a primary side arbitrator including primary side arbitration logic and primary side switching circuitry.

A system bus typically has a set width (e.g. 64 bits, 128 bits) and allows only one primary component to actively use the bus at any one time. In conventional systems, only one primary component can access any one of the given secondary components and any given time. Multiple primary components accessing secondary components in a manner that would cause data bit collisions if performed on the same data lines is referred to herein as accessing secondary components at the same time.

In one example, a hardware accelerator is accessing a secondary PIO. While the hardware accelerator is accessing the secondary PIO, a processor can not access an SDRAM through a peripheral interface even if both the primary streaming output device and the peripheral interface are available.

The system bus arbitration logic 201 determines which primary component has access to the system bus at any time. The system bus arbitrator 201 can determine which primary component can access a secondary component based on criteria such as fairness or priority. Any component or device that is configured to ensure that only one primary component can access any one of the secondary components at any given time is referred to herein as a system bus arbitrator or bus arbitration logic. Various schemes such as weighted fairness can be implemented to improve the efficiency of secondary component access, but such schemes can increase system complexity and latency. In conventional implementations, a computer system includes a single system bus arbitrator for each bus in the computer system.

According to various embodiments, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, performance can be improved using slave side arbitration.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, a hardware accelerator can be allocated a variety of ports for directly accessing a memory and the only resource in contention would be memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator or slave side arbitrator. In one embodiment, there is a secondary side arbitrator for each secondary component in a computer system. In other embodiments, there is a secondary side arbitrator for selected secondary components in a system. The techniques of the present invention recognize that both primary side arbitration and secondary side arbitration can benefit from more efficient bus arbitration logic.

Figure 3:
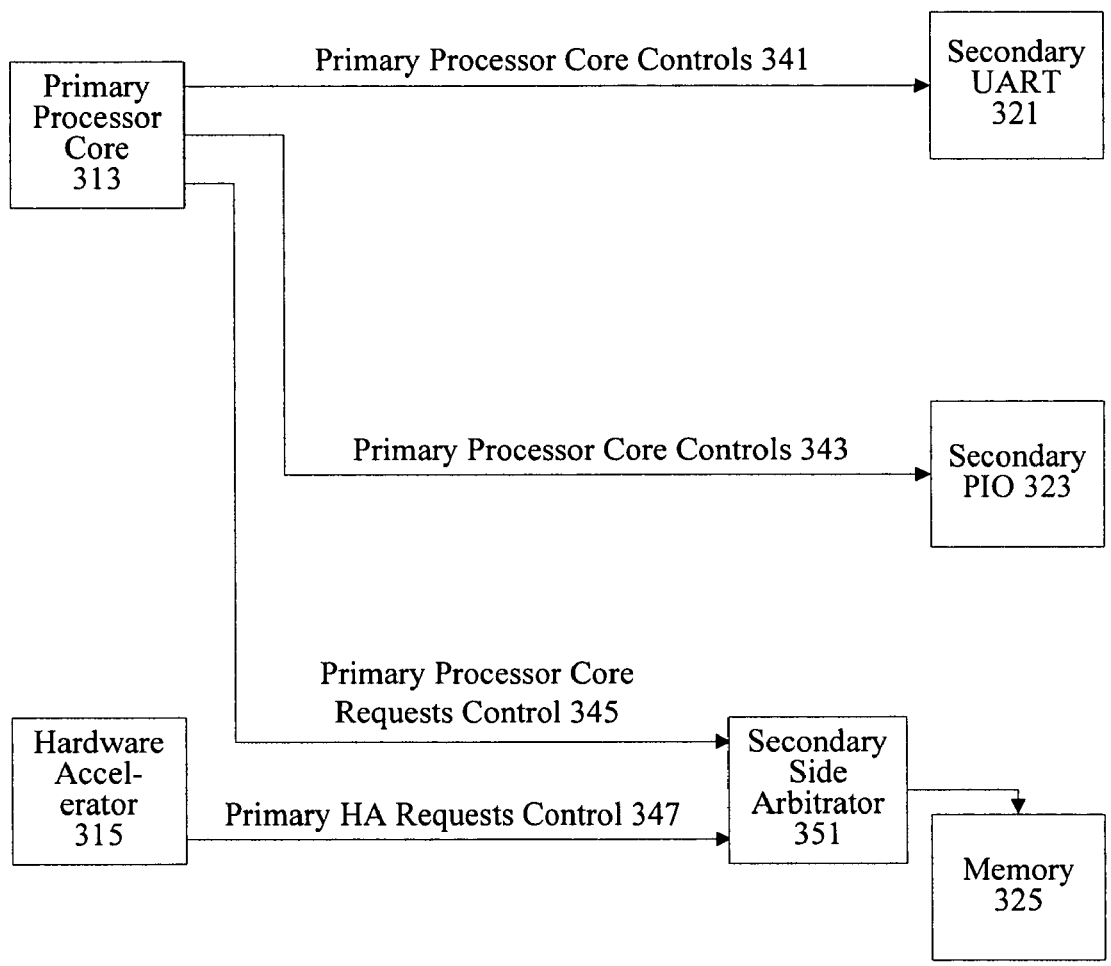
FIG. 3 is a diagrammatic representation showing an interconnection fabric.

FIG. 3 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments a secondary component such as peripheral interface 325 is associated with a secondary side arbitrator 351. However, secondary components UART 321 and PIO 323 are not associated with any arbitrator. In one example, secondary component UART 321 and secondary PIO 323 can only be accessed by primary CPU 313 and not by primary Ethernet device 315. A secondary memory component 325, however, can be accessed by both primary CPU 313 and primary Ethernet device 315. According to various embodiments, a secondary side arbitrator 351 allows a first secondary component in a system to be accessed by a first primary component at the same time a second secondary component in the system is accessed by a second primary component. For example, peripheral interface 325 can be accessed by primary Ethernet 315 through secondary side arbitrator 351 at the same time, secondary UART 321 is accessed by primary CPU 313.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Although secondary side arbitrators provide many benefits to programmable chip designers, arbitration logic efficiency is still needed to prevent performance degradation. It is also beneficial to provide priority considerations and fairness with any arbitration logic, secondary side arbitration logic or otherwise.

Figure 4:
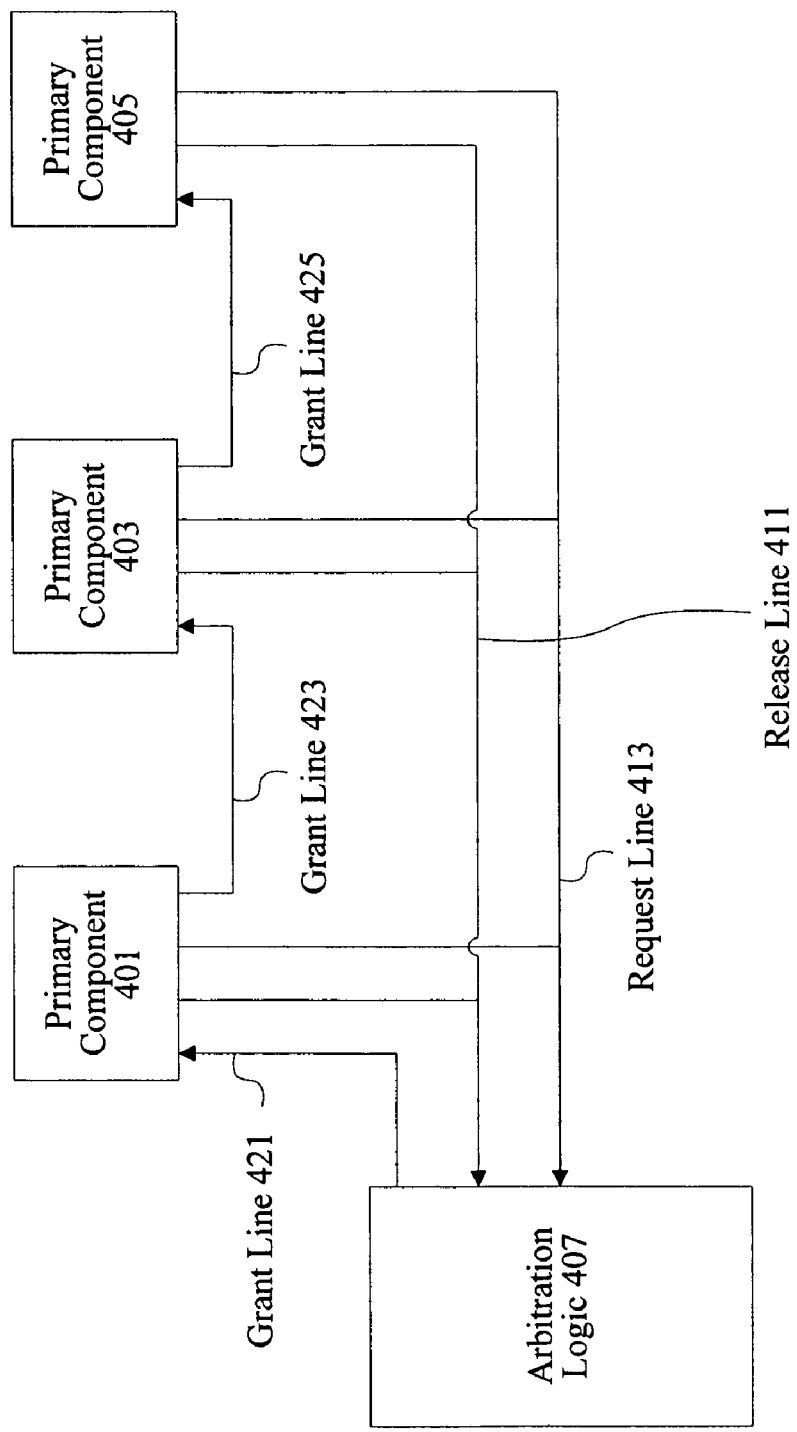
FIG. 4 is a diagrammatic representation depicting a daisy chain bus arbitration system.

FIG. 4 is a diagrammatic representation showing one example of a daisy chain used to conventionally implement arbitration logic. According to various embodiments, arbitration logic 407 is used to determine which one of devices 401, 403, and 405 gets access to a bus. Devices may be primary components. In one example, a bus grant line runs from arbitration logic 407 to device 401 as grant line 421, from device 401 to device 403 as grant line 423, and from device 403 to device 405 as grant line 425. Devices 401, 403, and 405 make requests for bus access on request line 413. Device 401 is deemed to have highest priority and device 405 is deemed to have lowest priority based on their positions in the chain. A high priority device 401 that needs access to the bus simply intercepts the bus grant signal and does not forward the signal along grant line 423. When device 401 or any other device has completed a bus transaction, the bus can be released by signaling the release line 411.

Daisy chain arbitration is relatively simple and provides a way to indicate priority. Daisy chain arbitration can be efficiently implemented in programmable chips. However, fairness can not be guaranteed, as a low priority device 405 may be entirely locked out of access to the bus if devices 401 and 403 continually intercept the bus grant signals. The use of a daisy chain grant signal also limits bus speed.

Other schemes such as centralized or parallel arbitration schemes can use one or more request lines, although multiple request lines are typically used. Individual devices such as master components individually request access to a bus. A centralized arbiter selects a device having an active request and notifies the selected device that it is now the bus mater. However, centralized arbiters are generally not used in programmable chips or programmable chip systems because centralized arbiters tend to be more complicated and require more logic. Even a marginally inefficient centralized arbiter can significantly hinder system performance, as a centralized arbiter becomes a bottleneck for bus usage.

Figure 5:
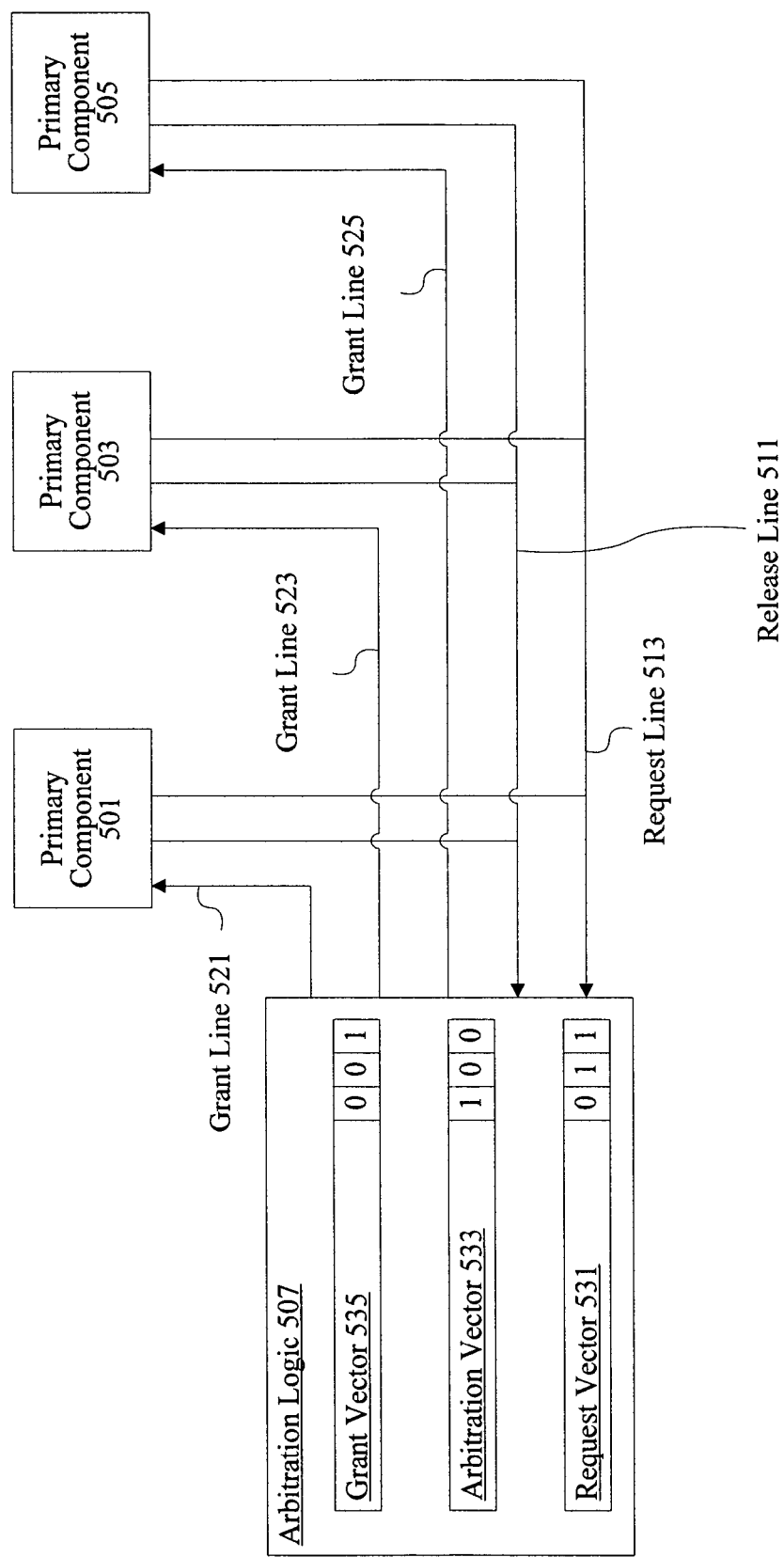
FIG. 5 is a diagrammatic representation showing arbitration logic having an arbitration vector, a request vector, and a grant vector.

FIG. 5 is a diagrammatic representation showing one example of arbitration logic that can be implemented using the techniques and mechanisms of the present invention. Devices 501, 503, and 505 are connected to arbitration logic 507 using one or more grant lines 521, 523, and 525. One or more request lines 513 and one or more release lines 511 can also be used. The arbitration logic 507 receives requests from individual devices 501, 503, and 505 and determines what device to make the bus master. According to various embodiments, arbitration logic 507 determines the bus master by performing arithmetic operations on bit sequences or vectors. Any bit sequence having bits associated with individual components is referred to herein as a vector. Bitwise arithmetic operations that are efficient on programmable chips can be used to quickly determine bus masters.

According to various embodiments, a variety of encoders can be implemented by using bitwise operations on vectors. In one example, request vector (R) 531 shows devices having active requests. For example, if devices 501 and 503 have active requests for bus access but device 505 does not, an R vector would be '110'. Similarly, if devices 503 and 505 have active requests but 501 does not, an R vector would be '001'. A grant vector (G) 535 provides an indication of what device has been selected. If device 501 has been selected, the G vector would be '100'. If device 505 has been selected, the G vector would be '001'.

For example, to implement a simple daisy chain encoder where a particular device is selected based on priority, with the rightmost or least-significant bit representing the highest priority device, the bus master can be determined using the following equation:

$$G = R \& (\sim R + 1)$$

where & represents a bitwise AND operation and ~ represents a bitwise inversion operation.

For example, if R=101000100, where the 1 bits represent devices with active requests and the rightmost 1 bit representing the highest priority device with an active request, the highest priority device can be selected as follows.

$$G = R \& (\sim R + 1)$$

$$G = 101000100 \& (010111011 + 1)$$

$$G = 101000100 \& 010111100$$

$$G = 000000100$$

In programmable chips, because of the add operation, the circuitry to implement the above calculation can be made very efficient by using carry-chain logic. However, no consideration of equality and fairness is made.

To provide fairness considerations, it is recognized that the prioritization technique can be generalized to find the right most 1 bit starting from a given bit-index N, simply by adding A=2N instead of adding 1. Consequently, the techniques of the present invention provide an arbitration vector 533. A sequence of bits rotated to find the rightmost 1 bit starting from a given bit-index is referred to herein as an arbitration vector. Consequently, to implement a priority encoder with fairness, the bus master can be determined using the following equation:

$$G = R \& (\sim R + A)$$

where & represents a bitwise AND operation and ~ represents a bitwise inversion operation.

In one example, A is initialized as 1. When A is 1, the master represented by the rightmost bit will be granted access to the bus. It should be noted that the phrase granting access to a bus is used herein, although it may also effectually be granting access to a secondary component or slave component. Each time the current bus master is about to relinquish its grant, A becomes G left-rotated by one position. In this manner, the current master becomes the lowest priority device, giving other devices an opportunity to obtain bus access.

In one example, R is '001001', where the 1 bits represent devices with active requests. The bus master can be determined as follows:

$$G = R \& (R + A)$$

$$G = 001001 \& (110110 + 000001)$$

where A is initially 1

$$G = 001001 \& 110111$$

$$G = 000001$$

The rightmost master is provided bus access. Now if the master relinquishes access, A is assigned the value of G left rotated by one bit position. It should be recognized that right rotation can also work.

$$A = G << 1$$

$$A = 000001 << 1$$

$$A = 000010$$

Now using the new value of A, a new bus master can be determined.

$$G = R \& (\sim R + A)$$

$$G = 001001 \& (110110 + 000010)$$

$$G = 001001 \& (111000)$$

$$G = 001000$$

Access has been granted to the other requesting device because the arbitration logic finds the first requesting device that is to the left of the relinquishing device. When the second device relinquishes access, A is assigned the current value of G left shifted by 1.

$A=G<<1$ $A=001000<<1$ $A=010000$

Now using the new value of A, a new bus master can be determined.

$G=R\&(\sim R+A)$ $G=001001\&(11110+010000)$ $G=001001\&000110$ $G=000000$

Although it may appear that none of the devices is being granted access, what happened is that the carry out of ~R+A was lost. The actual sequence with the carry out maintained is as follows $G=R\&(\sim R+A)$ $G=001001\&(110110+010000)$ $G=001000\&1000110$ $G=1000000$ G circularly carried to six digits would propagate the carry out from the ~R+A operation back to the least significant bit, so that G would be 000001. Alternatively, a circular carry chain could propagate the carry out from the ~R+A operation back to the least significant bit so that the sum becomes 000111, granting the first master again: G=000001. However, feeding a carry out from an add operation back to the least significant bit may confuse static timing analysis, and may even cause problems in logic synthesis.

According to various embodiments, the techniques and mechanisms of the present invention also provide a noncircular solution. According to various embodiments, the R vector is concatenated with itself, and operations are performed on both the top and bottom halves.

$G1=\{R,R\}\&(\{\sim R,R\}+A)$ $G1=\{001001\ 001001\}\&(\{110110\ 110110\}+010000)$ $G1=\{001001\ 001001\}\&\{110111\ 000110\}$ $G1=\{000001\ 000000\}$ G=(top half G1) OR (bottom half G1)

G=000001 OR 000000

G=000001

In this example, the carry out that was lost in the previous example increments the left half of the sum instead. According to various embodiments, the noncircular carry chain can be used to select a master in a fair manner using a variety of efficient logic mechanisms. Priority can also be provided by holding the value of A when A is associated with a higher priority device.

Figure 6:
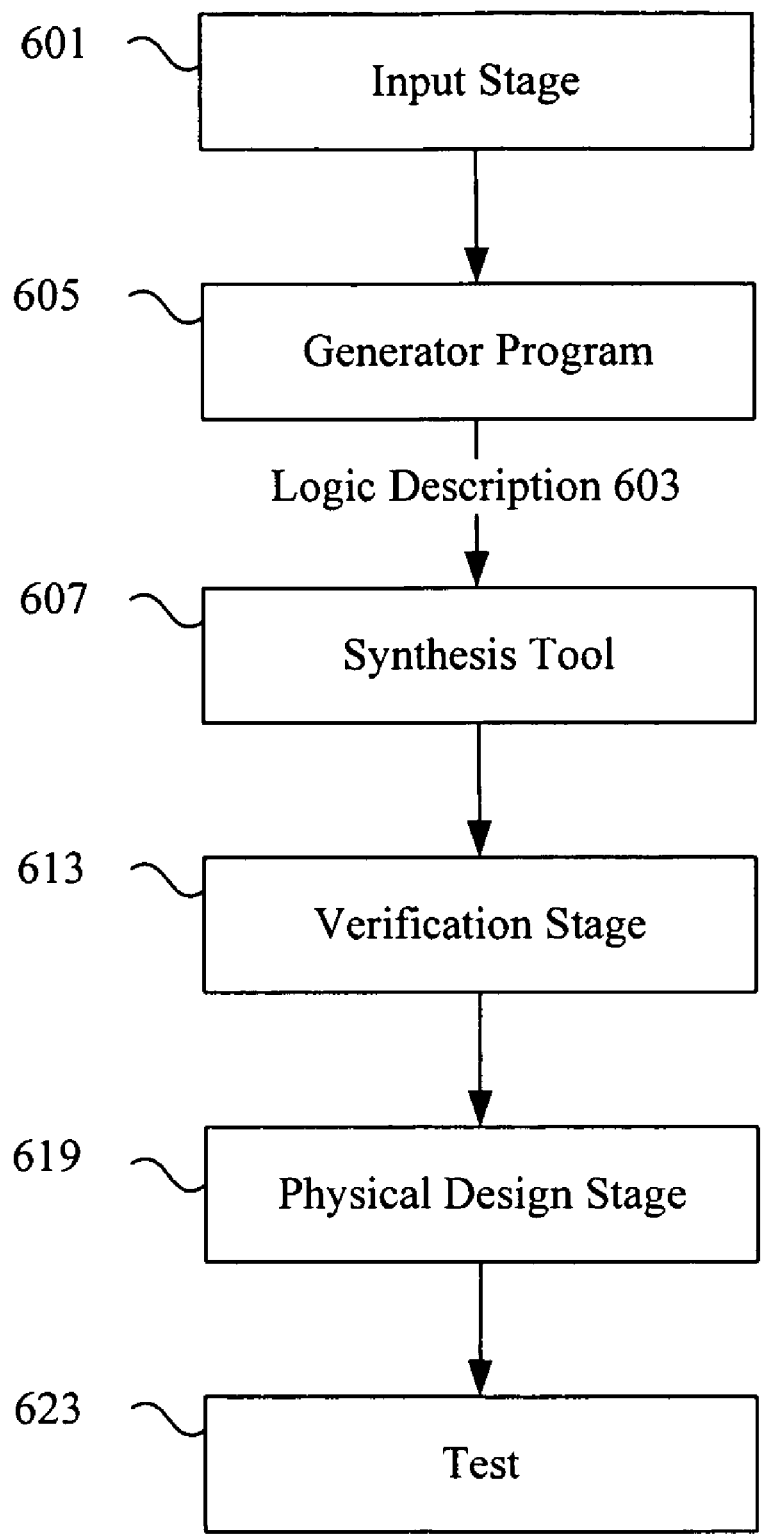
FIG. 6 is a diagrammatic representation showing a technique for implementing the programmable chip.

FIG. 6 is a diagrammatic representation showing implementation of an electronic device that can use arbitration logic according to various embodiments. An input stage 601 receives selection information typically from a user for logic such as a processor core as well as other components such as a streaming output device to be implemented on an electronic device. In one example, the input received is in the form of a high-level language program. A generator program 605 creates a logic description and provides the logic description along with other customized logic to any of a variety of synthesis tools, place and route programs, and logic configuration tools to allow a logic description to be implemented on an electronic device.

In one example, an input stage 601 often allows selection and parameterization of components to be used on an electronic device. The input stage 601 also allows configuration of variable or fixed latency support. In some examples, components provided to an input stage include intellectual property functions, megafunctions, and intellectual property cores. The input stage 601 may be a graphical user interface using wizards for allowing efficient or convenient entry of information. The input stage may also be a text interface or a program reading a data file such as a spreadsheet, database table, or schematic to acquire selection information. The input stage 601 produces an output containing information about the various modules selected.

In typical implementations, the generator program 605 can identify the selections and generate a logic description with information for implementing the various modules. The generator program 605 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 605 identifies pointers and provides ports for each pointer. One tool with generator program capabilities is System on a Programmable Chip (SOPC) Builder available from Altera Corporation of San Jose, Calif. The generator program 605 also provides information to a synthesis tool 607 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 609.

As will be appreciated by one of skill in the art, the input stage 601, generator program 605, and synthesis tool 607 can be separate programs. The interface between the separate programs can be a database file, a log, or simply messages transmitted between the programs. For example, instead of writing a file to storage, the input stage 601 can send messages directly to the generator program 605 to allow the generator program to create a logic description. Similarly, the generator program can provide information directly to the synthesis tool instead of writing HDL files. Similarly, input stage 601, generator program 605, and synthesis tool 607 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 607.

A synthesis tool 607 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 613 typically follows the synthesis stage 607. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 613, the synthesized netlist file can be provided to physical design tools 619 including place and route and configuration tools. A place and route tool typically locates logic cells on specific logic elements of a target hardware device and connects wires between the inputs and outputs of the various logic elements in accordance with logic required to implement an electronic design. The device can also be physically tested at 623.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 601, the generator program 605, the synthesis tool 607, the verification tools 613, and physical design tools 619 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 7:
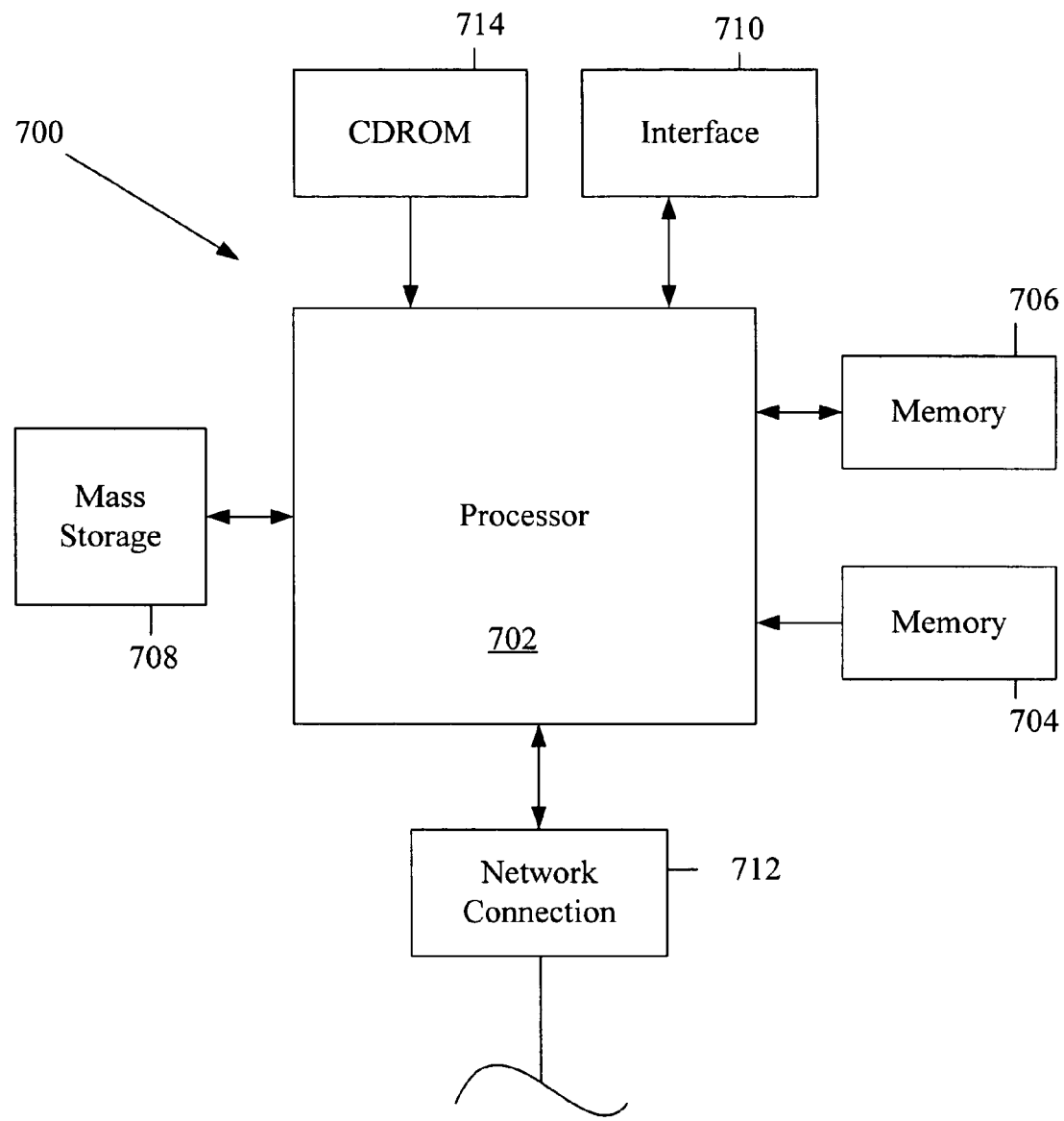
FIG. 7 is a diagrammatic representation depicting a computer system.

FIG. 7 is a diagrammatic representation showing a typical computer system that can be used to implement a programmable chip having bus arbitration with priority encoding and fairness. The computer system 700 includes any number of processors 702 (also referred to as central processing units, or CPUs) that are coupled to devices including memory 706 (typically a random access memory, or "RAM"), memory 704 (typically a read only memory, or "ROM"). The processors 702 can be configured to generate a test sequences for any designated processor. As is well known in the art, memory 704 acts to transfer data and instructions uni-directionally to the CPU and memory 706 is used typically to transfer data and instructions in a bi-directional manner.

Both of these memory devices may include any suitable type of the computer-readable media described above. A mass storage device 708 is also coupled bi-directionally to CPU 702 and provides additional data storage capacity and may include any of the computer-readable media described above. The mass storage device 708 may be used to store programs, data and the like and is typically a secondary storage medium such as a hard disk that is slower than memory. The mass storage device 708 can be used to hold a library or database of prepackaged logic or intellectual property functions, as well as information on generating particular configurations. It will be appreciated that the information retained within the mass storage device 708, may, in appropriate cases, be incorporated in standard fashion as part of memory 706 as virtual memory. A specific mass storage device such as a CD-ROM 714 may also pass data uni-directionally to the CPU.

CPU 702 is also coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. It should be noted that the system 700 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 708 or 714 and executed on CPU 708 in conjunction with primary memory 706.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. Although shared I/O lines have been described in the context of a memory controller and a simultaneous multiple primary component switch fabric, shared I/O lines can be used in a system without a memory controller and/or without a simultaneous multiple primary component switch fabric. It is therefore intended that the invention be interpreted to include all variations and equivalents that fall within the true spirit and scope of the present invention.

What is claimed is:

1. A method for providing access to a bus to one of a plurality of primary components, the method comprising:

providing a request vector (R), the request vector including the concatenation of bus access request signals from the plurality of primary components;

providing an arbitration vector (A), wherein the arbitration vector is rotated upon determining that a current bus master should no longer be provided with access to the bus;

combining the request vector and the arbitration vector to determine a grant vector (G), the grant vector identifying one of the plurality of primary components as bus master;

wherein the grant vector (G) is determined using the following formula:

$$G=R\&(\sim R+A)$$

where ~R is an inverted R and & is a bitwise AND operation.

2. The method of claim 1, wherein the request vector is a sequence of ones and zeros, a one representing an associated primary component having an active request and a zero representing no request for bus access.

3. The method of claim 1, wherein the length of the request vector corresponds to the number of primary components that can be granted access to the bus.

4. The method of claim 1, wherein the bus is a slave side arbitration fabric.

5. The method of claim 1, wherein A is assigned the value of G left rotated by one bit position after a bus master relinquishes access.

6. The method of claim 5, wherein A is held to the same value to provide weighted priority to the bus master.

7. The method of claim 6, wherein A is initialized with a value of 1.

8. The method of claim 1, wherein the grant vector (G) is determined using the following formula:

$$G1=\{R,R\}\&[\{\sim R,\sim R\}+A]$$

G=(bottom half G1) OR (top half G1)

where {R,R} is the request vector concatenated with itself, ~R is a bitwise inversion of R, and & is a bitwise AND operation.

9. A programmable chip system, comprising:

a plurality of primary components;

a secondary component;

a bus connecting the plurality of primary components to the secondary component;

bus arbitration logic configured to identify one of the plurality of primary components as bus master by combining a request vector (R) corresponding to the concatenation of bus access request signals from the plurality of primary components with an arbitration vector (A) to determine a grant vector (G), wherein the arbitration vector is rotated upon determining that a current bus master should no longer be provided with access to the bus;

wherein the grant vector (G) is determined using the following formula:

$$G=R\&(\sim R+A)$$

where ~R is an inverted R and & is a bitwise AND operation.

10. The programmable chip system of claim 9, wherein the request vector is a sequence of ones and zeros, a one representing an associated primary component having an active request and a zero representing no request for bus access.

11. The programmable chip system of claim 9, wherein the length of the request vector corresponds to the number of primary components that can be granted access to the bus.

12. The programmable chip system of claim 9, wherein the bus is a slave side arbitration fabric.

13. The programmable chip system of claim 9, wherein A is assigned the value of G left rotated by one bit position after a bus master relinquishes access.

14. The programmable chip system of claim 13, wherein A is held to the same value to provide weighted priority to the bus master.

15. The programmable chip system of claim 14, wherein A is initialized with a value of 1.

16. The programmable chip system of claim 9, wherein the grant vector (G) is determined using the following formula:

$$G1=\{R,R\}\&[\{\sim R,\sim R\}+A]$$

G=(bottom half G1) OR (top half G1)

where {R,R} is the request vector concatenated with itself, ~R is a bitwise inversion of R, and & is a bitwise AND operation.

17. A system for providing access to a bus to one of a plurality of primary components, the system comprising:

means for providing a request vector (R), the request vector including the concatenation of bus access request signals for the plurality of primary components;

means for providing an arbitration vector (A), wherein the arbitration vector is rotated upon determining that a current bus master should no longer be provided with access to the bus;

means for combining the request vector and the arbitration vector to determine a grant vector (G), the grant vector identifying one of the plurality of primary components as bus master;

wherein the grant vector (G) is determined using the following formula:

$$G=R\&(\sim R+A)$$

where ~R is an inverted R and & is a bitwise AND operation.

18. The system of claim 17, wherein the request vector is a sequence of ones and zeros, a one representing an associated primary component having an active request and a zero representing no request for bus access.

19. The system of claim 17, wherein the length of the request vector corresponds to the number of primary components that can be granted access to the bus.

20. The system of claim 17, wherein the bus is a slave side arbitration fabric.

21. The system of claim 17, wherein A is assigned the value of G left rotated by one bit position after a bus master relinquishes access.

22. The system of claim 21, wherein A is held to the same value to provide weighted priority to the bus master.

23. The system of claim 22, wherein A is initialized with a value of 1.

24. The system of claim 17, wherein the grant vector (G) is determined using the following formula:

$$G1=\{R,R\}\&[\{\sim R,\sim R\}+A]$$

G=(bottom half G1) OR (top half G1)

where {R,R} is the request vector concatenated with itself, ~R is a bitwise inversion of R, and & is a bitwise AND operation.

* * * * *